United States Patent [19]

Dyckman et al.

[11] 4,082,709
[45] Apr. 4, 1978

[54] LOW LEACHING ANTIFOULING ORGANOMETALLIC POLYESTERS

[75] Inventors: Edward J. Dyckman, Sunderland; Jean A. Montemarano, Annapolis; Eugene C. Fischer, Arnold, all of Md.

[73] Assignee: The United States of America as represented by the Secretary of the Navy, Washington, D.C.

[21] Appl. No.: 699,745

[22] Filed: Jun. 24, 1976

Related U.S. Application Data

[63] Continuation-in-part of Ser. No. 438,313, Jan. 31, 1974, Pat. No. 3,979,354.

[51] Int. Cl.² .................. C09D 3/68; C09D 5/14; C09D 5/16
[52] U.S. Cl. .................. 260/22 CB; 106/15 R; 260/22 A; 260/30.8 DS; 260/33.6 R
[58] Field of Search .......... 260/22 CB, 22 A, 33.6 R, 260/30.8 DS; 106/15 AF, 15 R

[56] References Cited

U.S. PATENT DOCUMENTS

| 3,167,473 | 1/1965 | Leebrick | 526/240 |
| 3,684,752 | 8/1972 | Goto et al. | 424/288 |
| 3,806,530 | 4/1974 | Dorfelt et al. | 106/15 AF |
| 3,847,851 | 11/1974 | Tugukuni et al. | 260/22 CB |
| 3,861,949 | 1/1975 | Onozuka et al. | 106/15 AF |
| 3,923,716 | 12/1975 | Powanda | 106/15AF |
| 4,039,494 | 8/1977 | Drisko | 106/15 R |

FOREIGN PATENT DOCUMENTS

| 1,062,324 | 3/1967 | United Kingdom | 106/15 AF |
| 1,107,929 | 3/1968 | United Kingdom | 106/15 AF |
| 1,124,297 | 8/1968 | United Kingdom | 106/15 AF |

*Primary Examiner*—Ronald W. Griffin
*Attorney, Agent, or Firm*—R. S. Sciascia; A. L. Branning; H. B. Field

[57] ABSTRACT

Marine structures which are designed to be submerged in an aqueous environment containing fouling organism are protected from fouling by the use of an organotin containing polymer wherein the tin is chemically bonded to the polymer. The polymer inhibits fouling of the exposed surface of the structure while minimizing the adverse effects on the surrounding environment due to reduced leaching of the organotin compound from the polymer.

17 Claims, No Drawings

LOW LEACHING ANTIFOULING ORGANOMETALLIC POLYESTERS

This application is a continuation-in-part of copending application Ser. No. 438,313, filed Jan. 31, 1974, now U.S. Pat. No. 3,979,354, issued Sept. 7, 1976.

BACKGROUND OF THE INVENTION

This invention relates to a method and composition for preventing the fouling of submerged objects or marine structures while also minimizing pollution, and more particularly to a method and composition for preventing fouling of marine structures for an extended period of time by using organotin compounds which are chemically bonded to synthetic polymers.

From the beginning of man's attempt to use water to travel, he has been plagued with the problem resulting from the fouling of ships, buoys, pilings, and other types of marine structures, by organisms present in the water. It has been found that microorganisms, their viscous bio-organic products and absorbed organic matter, constitute a tenacious, opaque slime which forms on these submerged surfaces. The initial organisms in this fouling sequence are bacteria followed by a biotic progression of diatoms, hydrids, algae, bryozoans, and finally macrofoulants. Macrofoulants tend to be rugophilic, settling on roughened surfaces in preference to smooth surfaces. It is thought that primary marine slimes precondition the submerged surface in some manner stimulating the settling of macrofaulants. This theory is supported by the fact that barnacle settlement is less frequent on clean glass surfaces compared to those covered with emollient films high in particular matter. This film may provide a physical substrate and/or a nutritive source which encourages the attachment of macroscopic plants and animals.

The resultant effect of the concentration of these plants and animals settling and attaching themselves to ships is that they contribute significantly to speed reduction, they increase fuel consumption, and in the area of concern over water craft detection, they strengthen the noise signature of vessels under way thereby rendering covert activity more difficult.

The problem of fouling applies not only to vessels but also to other marine structures. For example, fouling of sonar domes has been found to seriously limit the active and passive modes of operation of ships' acoustical systems. Fouling of moored data systems and ship-and-shore facilities by marine organisms impedes operations and necessitates a large maintenance allocation. Buoys can shift due to the excessive weight of fouling organisms. Wood pilings in berthing facilities undergo structural weakening and ultimate destruction due to marine borer and fungal attack. The fouling of piping including steel piping and bronze couplings and fittings in the sea-water intake piping systems of ship-and-shore facilities leads to reduced flow rates, valve seat damage, and accelerated metal corrosion. Concrete of ferro-cement or other similar structures are also adversely affected by fouling organisms.

It is only since the beginning of this century that improvements have been made in the early Phoenician methods of using copper cladding and poisonous paints to prevent fouling. One such improvement involved the use of asphalt as an antifouling coating. Another improvement involved the use of coating containing copper salts or oxides. In addition, organometallic salts, e.g., tri-n-butyltin oxide (TBTO), tri-n-butyltin fluoride (TBTF), tri-n-butyltin sulfide (TBTS), being extremely powerful biocides and toxic to a wide range of marine organisms, have been used as the active ingredients in a variety of antifouling coatings. Investigations into the use of organotin compounds for use in antifouling paints have received much attention because coatings containing these compounds exhibit excellent pigment retention, but do not accelerate the corrosion of metal substrates.

However, these and other state-of-the-art compositions possess several drawbacks which limit their use as effective antifoulants. Asphalt lacks the desired durability to make it an effective answer to the problems posed. Other existing antifouling coating systems involve the use of paints which typically contain sufficient water soluble pigments, metal salts and inert fillers for direct contact to occur between the particles within the paint film; as one particle dissolves, another in contact with it is exposed to solvolysis. This process, called leaching, is uncontrolled and varies with such factors as coating age, water velocity, temperature and salinity, and the primary slime layer. Quantitative information indicates that in most cases the leaching rate of antifouling paints is excessive and poses a potential environmental hazard. As a result, the best available antifouling coatings are inefficient and short lived because of the above-mentioned leaching process. This inefficiency leads to the concentration of the antifouling agent in the water in quantities well above normal oceanic background.

Although concern over avoiding a potential polution hazard was not a motivating factor, attempts have been made in the past to incorporate the toxic substance in a polymeric antifouling coating composition by chemically bonding the toxic ingredient to the polymer. For example, see Leebrick, U.S. Pat. No. 3,167,473, or Goto et al., U.S. Pat. No. 3,684,752. However, this type of antifouling compositions has not proved to be commercially successful, apparently because of the inability of the resulting coatings to maintain their integrity over an extended period of time.

Thus, after approximately 12 to 20 months, or 50,000 miles transit the presently available antifouling paint systems begin to foul, which is indicative of the depletion of most of the antifouling agent from the coating into the marine environment, or of a complete breakdown of the coating itself. This short performance time is far less than the life time of 5 years or more desired of an antifouling coating.

The leaching rate of metallic salts and organometallic salts from presently used antifouling coating systems is governed by the relative proportions and solubilities of three components: rosin, antifouling agent and pigment. Rosins are resinous organic acids which have a water solubility of 100 $mg/cm^2/day$. In addition to a relatively high solubility, rosins are consumed by sliming marine bacteria. This results in an accelerated biodegradable action, thus adding to the breakdown of the coating and subsequent accelerated release of metallic and organometallic salts. At present the primary antifouling agents used by the U.S. Navy are cuprous oxide which has a water solubility of 0.5 mg/l and tributyltinfluoride which has a water solubility of 2.9 mg/l. Leaching of inorganic and organometallic antifouling salts from coating formulations could possibly be reduced by using their less water-soluble homologs in conjunction with insoluble pigments and as little rosin as possible. However, state-of-the-art antifouling technology has not provided an effective antifouling composition having a controlled leaching rate which minimizes the presence of toxic antifouling agents in the marine environment. Hence, it would be desirable to provide a new class of effective antifouling compositions having low leaching rates as compared to hitherto available compositions.

SUMMARY OF THE INVENTION

Accordingly, it is an object of this invention to provide a composition and method for the protection of marine structures from fouling organisms.

It is also an object of this invention to provide a composition and method for the protection of marine structures from fouling organisms for an extended period of time.

It is a further object of this invention to provide a composition and method for preventing the formation of a primary slime layer on marine structures.

Another object of this invention is to provide a composition and method for the prevention of fouling of marine structures while avoiding a potential environmental hazard.

It is also an object of this invention to provide an antifouling composition characterized by a low leaching rate of the antifouling agent from the composition.

These and other objects of this invention are met by providing a composition which comprises an organotin containing polymer wherein the organotin moiety is chemically bonded either directly to the polymer backbone or through a curing agent for the polymer, and a method of using said composition which involves forming, coating or impregnating a marine structure with said composition.

DESCRIPTION OF THE PREFERRED EMBODIMENTS

The present invention provides a novel polymeric material possessing a low leaching rate, which is nonpolluting, and has excellent biocidal properties, and which upon application to the surface of, or incorporation into, a marine structure results in a structure which is free of fouling organisms but does not contribute to pollution. This result is obtainable due to the fact that the biocidal quality of the antifouling agent protects the surface of the structure but is not detrimental to the animal or vegetable life immediately surrounding the protected structure because of the low leaching rate of the antifouling agent from the polymer.

This new generation of biocidal polymers consists of low leaching, antisliming, organometallic polymers suitable as protective coatings for ship bottoms and other submerged surfaces, wherein the backbone polymer is a vinyl resin such as a polyacrylate or a poly (methyl vinyl ether/maleic acid); an alkyd resin; or an epoxy resin; and chemically incorporated in the polymer is a $R_3Sn$-group such as tributyltin, tripropyltin, triphenyltin; or tribenzyl tin. These polymers may be used in any number of suitable forms including (1) low leaching organometallic polymeric films suitable for use as coatings or in reinforced or self-supporting structures; (2) low leaching organometallic polymeric syrups of the above described organometallic polymers applicable for the impregnation of structural woods in order to preserve these structures against bacteria, fungi and marine foulant attack; and (3) low leaching, granulated, organometallic polymers to be used for incorporation into ferrocement, and other marine and fresh water concrete structures, thus producing a homogeneous nonfouling ferrocement and/or concrete structural composite.

It is estimated that these materials will extend the longevity of antifouling systems to at least 5 years. In addition, transparent, nonwettable, slimicidal films of the organometallic polymers can be used on underwater optical devices.

Because the antifouling compositions in general use today do not provide a satisfactory means of controlling the leaching rate of toxic coating components into the marine environment, the idea of chemically binding biocidal organometallic compounds on polymer backbones was conceived of as a solution to the problem. The resultant materials, organometallic polymers, are surface hydrolyzed in sea water to trigger their antifouling effectiveness. Laboratory studies show that the chemically bound organometallic moieties are released at a rate that is dependent on the nature of the organometallic polymer. As part of an effort to develop antifouling coatings having the lowest possible controlled leaching rates, various organometallic polymers were sythesized for the purpose of determining the rate of release of organometallic moieties from these polymers as well as their antifouling effectiveness. Factors influencing the rate of hydrolysis of the organometallic polymer, include polymer type, the degree of cross-linking within the polymer backbone and the degree of substitution by organometallic groups along the polymer backbone. Environmental conditions such as sea-water temperature, salinity, oxygen content, hydrogen ion concentration, and turbulence also influence the hydrolysis rate. Due to water hydrolysis, these organometallic ions are released from the polymer backbone at a controlled rate which is at least one order of magnitude less then state-of-the-art antifouling coatings. As a result, this chemical conservation of the biocidal organometallic agents will provide longer-term antifouling protection for marine structures while reducing the potential pollution hazard attributed to presently used antifouling coatings by a factor of at least 10.

Any suitable method may be used to incorporate the organotin moiety into the polymer. For example, the incorporation can be accomplished by using an esterification reaction between an organotin oxide or hydroxide and a free carboxylic acid group present in the polymer. The organo-groups substituted on the tin may be the same or different and are selected from the group consisting of propyl, butyl, benzyl, and phenyl. Other groups do not appear to give the required long life antifouling capabilities. While it is not desired to be limited to any particular theory, it is believed that the chemical bond between the antifouling agent and the polymer prevents excessive leaching of the toxic agent from the composition. Because excessive leaching does not take place, there is no excess biocide in the water. Hence, there is no killing of plant and animal life in the water surrounding the protected structure by the antifouling composition. The low leaching rate also extends the life of the antifouling composition.

The reaction between the carboxylic acid group and the organotin oxide or hydroxide can be carried out in a number of ways. A monomeric acid may be esterified with a suitable tin compound and polymerized alone or in combination, with other monomers which may or may not contain organotin moieties. Alternatively, the tin compound may be reacted with free carboxylic acid groups on the polymer backbone. Also, the organotin compound can be chemically combined with a crosslinking or curing agent and used to crosslink or cure a polymer, especially a thermosetting polymer. Any other suitable method can also be used to chemically incorporate the organotin compound into the polymer provided the tin compound is chemically bonded to the polymer. It is the chemical bond which gives the improved durability, and low leaching characteristics to the polymer.

Of the particular organotin groups, the tributyl- or tripropyl-tin groups are the most effective because they possess greater toxicity.

The tributyl tin oxide or hydroxide can also be chemically reacted with a polymer which is chemically bonded to other tin compounds. When a tributyl or tripropyl tin containing compound in conjunction with another organotin containing compound is incorporated in a polymer the result is an antifouling composition more durable than the second organotin containing compound acting alone. Also, various tin-containing polymers can be mixed in any proportion in order to achieve desired antifouling properties. Furthermore, a single polymer may contain more than one type of organotin compound. Mixtures of organotin compounds on a polymer or mixtures or organotin containing polymers are effective against a broader spectrum of fouling agents.

The tin compound used in accordance with the present invention has the following structural formula:

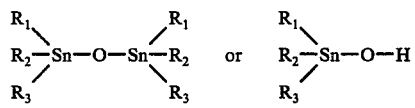

wherein $R_1$, $R_2$, and $R_3$ are selected from a group consisting of butyl, propyl, phenyl and benzyl. $R_1$, $R_2$, and $R_3$ can be the same or different.

Suitable polymers to which the organic tin compounds may be chemically bonded are thermoplastic polymers such as vinyl polymers and thermosetting polymers such as polyester resins and epoxy polymers. Vinyl polymers include homopolymers and copolymers of acrylic and methacrylic acid monomers. The organotin containing polymers can be formed by polymerizing organotin oxide or hydroxide-acrylic acid esters alone or in combination with monomers which may or may not contain an organotin moiety. Monomers suitable for forming the acrylic polymers are acrylic acid and methacrylic acid. To incorporate the organotin compound in the acrylic polymer, the acid groups are usually esterified with the organotin compounds subsequent to polymerization of the acid monomers.

Another suitable vinyl polymer is a copolymer of methyl vinyl ether and maleic acid. Incorporation of the organotin compound is achieved by esterification of the acid group.

The development of organometallic polyesters and organometallic epoxies as effective antifouling materials has also been accomplished. Unsaturated alkyd resins prepared from the condensation reaction of polyhydric alcohols such as glycols and other polyols and polybasic acids such as adipic, sebacic, phthalic and maleic acid are cured with tributyltin methacrylate in a 1:1 molar ratio using an initiator to produce organometallic polyesters. Styrene in varying proportions may also be added to the monomer mixture prior to curing. These organometallic polyesters can either be dissolved in a solvent with or without additives such as pigments, thixotropic agents, or antisettling agents, to produce an antifouling coating, or used by themselves in antifouling applications, i.e., antifouling gel coats. Furthermore, incorporation of glass fibers into this resin could produce a glass reinforced laminate with antifouling capability. In addition to incorporating the organotin moiety by curing an unsaturated resin with tributyltin methacrylate or other organometallic unsaturated monomers, the organotin group can be chemically incorporated on the resin backbone by esterification of some of the free carboxyl groups present where polybasic acids have been used in the resin formulation.

The concept of producing an antifouling structural plastic by curing with an organometallic agent can also be applied to epoxy resins. Unsaturated acids such as acrylic acids are known curing agents for glycidyl ether epoxy resins. When an organic acid is employed to cure an epoxy resin in an hydroxyl-free medium, the initial reaction involves the carboxyl group, followed by the reaction of the epoxy with the formed hydroxyl. The double bond of an unsaturated acid during this reaction remains inactive, and may be used to incorporate the organometallic reagent on the curing agent. It is known that tributyltin methacrylate can be copolymerized with methacrylic acid. Therefore, a low molecular weight copolymer of tributyltin methacrylate and methacrylic acid can be utilized as an organometallic curing agent for epoxy resins. Modifications of the structures of amines, polyamines, polycarboxylic acids, and like compounds presently used as epoxide curing agents by incorporation of a tributyltin carboxylate group, e.g., $H_2NCH_2CO_2SnR_3$ and $R_3SnO_2CCH(CO_2H)_2$ where R is an organic radical can be prepared to function as new curing agents serving as carriers for the biocidal organotin moiety. In addition, novel organometallic epoxy resins can also be prepared. The esterification of acid groups on the resin backbone produces organometallic epoxy resins of the following generalized formula:

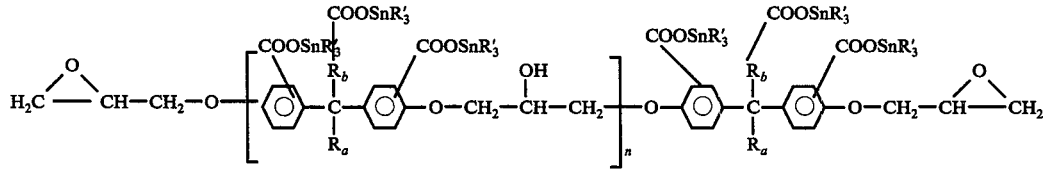

wherein $R_a$ and $R_b$ are any alkyl group of up to 25 carbon atoms and are the same or different; R' is butyl, propyl benzyl, or phenyl; n represents the numer of repeating units and ranges from 1 to about 35,000.

The above structure formula indicates that the tributyltin carboxylate group may be attached to the aromatic rings and/or the aliphatic side chains.

Organotin epoxy resins may also be prepared by the copolymerization of an organotin methacrylate such as tributyltin methacrylate with glycidyl methacrylate to produce the following structure:

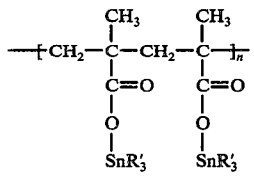

wherein R' is a butyl, propyl or benzyl, group n represents the numer of repeating units and ranges from about 1 to about 35,000.

Organotin methacrylate can also be copolymerized with unsaturated epoxy resins such as unsaturated analogs of bisphenol A,

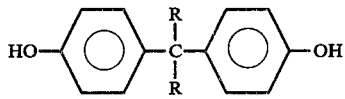

wherein one or both R groups represent an unsaturated alkyl chain. These organometallic epoxy resins can be cured with either organometallic curing agents such as described above or commercially avaiable curing agents which do not contain the organometallic agent. Organometallic epoxy resins when prepared by any of the above syntheses are antifouling materials useful either as coatings or in structural applications.

The effectiveness of the organotin containing polymer as to both antifouling capabilities and durability depends on the amount of organotin present. Molecular weight of the polymer does not appear to have an effect on these properties. However, polymers having a 6000–7000 molecular weight range are more conveniently used. The organotin containing component is operable in any range. However, the polymer which contains at least 20% of the organotin component is most effective. For example, if organotin methacrylate and methyl methacrylate are polymerized together, there should be at least one unit of orgnotin methacrylate for every four units of methyl methacrylate. With regard to the amount of polymer present, a coating comprising the polymer has been tested and the following conclusions drawn. While any reasonable coating thickness is feasible, coatings up to ⅛-inch thick are most useful. Coatings in the neighborhood of 20 mils thickness are also useful. Thickness may vary with amount of tin in the polymer and the length of time for which protection is desired.

The following examples are presented to illustrate the invention without unduly limiting the invention. All parts and percentages are by weight of the composition unless otherwise specified.

EXAMPLE I

The preparation of cross-linked unsaturated polyesters was carried out according to the following procedures.

P52, POLYCONDENSATION PRODUCT OF MALEIC ANHYDRIDE, PROPYLENE GLYCOL AND ETHYLENE GLYCOL CROSS-LINKED BY TRI-n-BUTYLTIN METHACRYLATE

A mixture of propylene glycol (2.0 mole), ethylene glycol (0.70 mole), and 100 ml of toluene was placed in a 1-liter, four-necked resin flask which was equipped with a Dean and Stark trap which was connected to a reflux condenser; a thermometer, which read the temperature of the reactants, a mechanical stirrer, and a nitrogen gas inlet. The mixture was heated with stirring under a gentle stream of nitrogen at 150°–180° C for 15 minutes while water was collected in the Dean and Stark trap. The Dean and Stark trap was drained and distillation continued unitl all the 100 ml of toluene were recovered. The apparatus was allowed to cool, and maleic anhydride (1.25 mole) was added to the dried glycols. The Dean and Stark trap was filled with xylene and 100 ml of xylene was added to the flask. The temperature was quickly raised to 200° C, while a nitrogen stream was maintained. Water was collected in the Dean and Stark trap and lost xylene was replaced during heating for 2 hours. At the end of that time, all xylene was collected. The flask was removed from the heating mantle and the unsaturated resin was cooled to 50° C. During this cooling time, a solution of tri-n-butyltin methacrylate (0.144 mole) with benzoyl peroxide (0.5% by weight of total reactants) was prepared. The warm unsaturated polyester resin (0.072 mole) was transferred under nitrogen into a 100 ml, four-necked resin flask equipped with a reflux condenser, a thermometer such that it read the temperature of the reactants, a nitrogen inlet, and a mechanical stirrer. The tri-n-butyltin methacrylate/benzoyl peroxide solution was mixed in with the unsaturated polyester and heated at 80° C for 2 hours. The resultant cross-linked polyester resin was dissolved in refluxing benzene and could be cast as a transparent, yellow elastomeric film from benzene solution. Acid number, of the unsaturated polyester resin prior to curing with tri-n-butyltin methacrylate was 30. Analysis showed 24.11% Sn.

P53 POLYCONDENSATION PRODUCT OF MALEIC ANHYDRIDE, PROPYLENE GLYCOL AND ETHYLENE GLYCOL CROSS-LINKED BY TRI-n-BUTYLTIN METHACRYLATE

P53 was prepared similar to P52 except that the amounts of reactants used were maleic anhydride (0.625 mole), propylene glycol (0.5 mole), and ethylene glycol (0.175 mole). Tri-n-butyltin methacrylate (0.222 mole), the unsaturated alkyd resin (0.222 mole) and benzoyl peroxide (0.5% by weight) were reacted at 95° C for 45 minutes. The resultant polymer was dispersed in benzene and could be cast as a white granulated film. The acid number was 73 and analysis showed 20.20% Sn.

P54 POLYCONDENSATION PRODUCT OF SEBACIC ACID AND BUTENEDIOL CROSS-LINKED BY TRI-n-BUTYLTIN METHACRYLATE

P54 was synthesized by the general method set forth above. In this synthesis, equimolar quantities of sebacic acid (0.2 mole) and 2-butene-1,4-diol(0.2 mole) underwent polycondensation. The resultant unsaturated alkyd was then cured with tri-n-butyltin methacrylate (0.2 mole) using benzoyl peroxide (0.5% by weight) as the initiator. The resultant polymer could be cast as a yellow, opaque film from benzene solution. The acid number is 81 and analysis showed 21.11% Sn.

P56 POLYCONDENSATION PRODUCT OF MALEIC ANHYDRIDE AND D-SORBITOL CROSS-LINKED BY TRI-n-BUTYLTIN METHACRYLATE

P56 was prepared as above by reacting maleic anhydride (0.16 mole) and D-Sorbitol (0.16 mole). This unsaturated alkyd was dissolved in dimethyl sulfoxide (DMSO) and was cured with tri-n-butyltin methacrylate (0.16 mole) using benzoyl peroxide (0.5% by weight) as the initiator. The resulting polymer could be cast from DMSO solution as a brown, transparent film.

P59 POLYCONDENSATION PRODUCT OF MALEIC ANHYDRIDE, AZELAIC ACID AND PROPYLENE GLYCOL CROSS-LINKED BY TRI-n-BUTYLTIN METHACRYLATE

P59 was prepared similar to the above method by reacting maleic anhydride (0.225 mole), azelaic acid (0.275 mole), and propylene glycol (0.5 mole). While the unsaturated alkyd was warm (between 70° and 80° C) it was dissolved in tri-n-butyltin methacrylate (0.225 mole). Benzoyl peroxide (1.0% by weight) was dissolved in this reaction mixture. The fluid was then degassed by placing it in a vacuum and poured into a metal mold. The mold was composed of two steel plates treated with Dow Corning "20" compound (a silicone release agent). The filled mold was fastened by "c" clamps and the resin was cured at 40° C for 14 hours followed by a cure at 80° C for 6 hours. The resultant polymer was a white waxy solid. The acid number was 65 and analysis showed 15.39% Sn.

P61 POLYCONDENSATION PRODUCT OF MALEIC ANHYDRIDE, AZELAIC ACID AND PROPYLENE GLYCOL CROSS-LINKED BY TRI-n-BUTYLTIN METHACRYLATE

P61 was prepared similar to 59. Maleic anhydride (0.3 mole), azelaic acid (0.2 mole), and propylene glycol (0.55 mole) were reacted. This unsaturated alkyd resin was cured with tri-n-butyltin methacrylate (0.3 mole) and peroxide (0.5% by weight) in a polished stainless steel mold. The mold, surfaces treated with Dow Corning Release agent XR43130, were separated from one another by a Teflon tube. The filled mold, fastened by "c" clamps was heated to 40° C for 14 hours followed by 80° C for 6 hours. The resulting polymer was a yellow, opaque solid. The acid number was 60.

Organometallic curing agents for epoxy resins have also been synthesized. Glycine, p-aminobenzoic acid, and 2-acetamidoacrylic acid were used because they contain active hydrogen groups needed to cure an epoxy resin, as well as carboxylic acid groups which could be esterfied to form organometallic esters. The preparation of the tributyltin ester of each acid was based on the reaction of the carboxylic acid group with bis (tri-n-butyltin) oxide in a 2:1 molar ratio (Table 1). The catalyst in each reaction was p-toluenesulfonic acid (used 0.5% by weight). These curing agents or similar curing agents can be used to cure epoxy resins. For example, E1 cured successfully Epon 1001 a high molecular weight epoxy resin produced by the condensation of epichlorohydrin with bisphenol A, and obtainable from the Shell Chemical Co. In this fashion an epoxy resin may have the organotin moiety incorporated therein and render the epoxy resin a suitable antifouling agent.

EXAMPLE 2

Organotin containing epoxy polymers were prepared according to the following procedures:

I. Poly(tributyltin methacrylate/glycidyl methacrylate)

The reaction was carried out in a 300 ml, 3-necked flask equipped with a reflux condenser, a thermometer such that it read the temperature of the vapor, and a magnetic stirrer. Tributyltin methacrylate (.07 moles), glycidyl methacrylate (.07 moles) and 2.2'-azobis(2-methylpropionitrile) (0.6% by weight) were reacted in 90 ml of toluene. The reaction was refluxed for 16 hours between 75°–80° C. The polymer was a clear, film forming resin which could be cured to a hard film by methanediamine (one equivalent of N-H is used for each equivalent of epoxide in the polymer) after 3 hours at 100° C.

TABLE 1

PREPARATION OF AN ORGANOMETALLIC CURING AGENT
(CATALYST: p-TOLUENESULFONIC ACID, 0.5% BY WEIGHT)

| Curing Agent | Ester Synthesis | Reactants Acid | Organometallic | Solvent | Reaction Temp. °C | Reaction Time, hr |
|---|---|---|---|---|---|---|
| E1 | Tributyltin glycinate | Glycine | Bistributyltin oxide | Ethanol: $H_2O$ (1:1) | 78 | 22 |
| E2 | Tributyltin p-aminobenzoate | p-aminobenzoic acid | Bistributyltin oxide | Ethyl acetate | 82 | 30 |
| E3 | Tributyltin ester of 2-acetamidoacrylic acid | 2-acetamidoacrylic acid | Bistributyltin oxide | Dimethylformamide | 80 | 12 |

II. Preparation of Tributyltin Ester of 4,4-bis(4-hydroxyphenyl) — pentanoic acid The synthesis was carried out in a reaction flask provided with an azeotropic distillation head connected to a reflux condenser, a thermometer and a stopper. An analog of bisphenol A, 4,4-bis(4-hydroxyphenyl) — pentanoic acid (0.035 mole), and tri-n-butyltin oxide (0.0175 mole) were reacted in 40 ml of benzene. After 4 hours of refluxing, 0.30 ml of $H_2O$ was collected. The ester was recrystallized from ethanol as a pale brown powder with m.p. of 108° C. Analysis of the ester showed 21.79% Sn. This ester was reacted with epichlorohydrin to produce an organotin epoxy resin.

EXAMPLE 3

The antifouling performance of the low leaching organotin containing polyesters was proven at the U.S. Naval Shipyard at Pearl Harbor, Hawaii, which is a heavy fouling area. The panels were judged by the percentage of surface covered by fouling. The fouling reading is determined as 100 minus the percent covered by fouling.

Tables 2 and 3 show the composition of the various polyester formulas which were tested.

While the organotin containing polyesters were applied by themselves, i.e., in the absence of solvents or other additives, solvents and additives such as pigments, thixotropic agents or antisettling agents may be used in combination therewith.

TABLE 2
UNSATURATED POLYESTER RESINS PREPARED BY CONDENSATION REACTION

| Unsaturated Polyester Resin Synthesized | Reactants | | | |
|---|---|---|---|---|
| Polymer Identification* | Polybasic acid(s) | Polyhydric alcohol(s) | Molar Ratio of acid(s) to alcohol(s) | Solvent(s) |
| P52A | Maleic anhydride | ethylene glycol, propylene glycol | 1.78:1.00:2.85 | toluene, xylene |
| P53A | Maleic anhydride | ethylene glycol, propylene glycol | 3.57:1.00:2.85 | toluene, xylene |
| P54A | Sebacic acid | 2-buetene-1,4-diol | 1.00:1.00 | xylene |
| P56A | Maleic anhydride | D-Sorbitol | 1.00:1.00 | dimethyl |
| P57A | Maleic anhydride, phthalic anhydride | propylene glycol | 1.58:1.00:2.85 | toluene, |
| P59A | Maleic anhydride, Azelaic acid | propylene glycol | 1.00:1.22:2.22 | — |
| P61A | Maleic anhydride, Azelaic Acid | propylene glycol | 1.50:1.00:2.50 | — |

*A after the polymer letter indicates the resin is uncured.

TABLE 3
ANTIFOULING PERFORMANCE OF ORGANOTIN CONTAINING POLYESTERS

| Organometallic Polyester*+ | % Antifouling Performance | Months Exposed |
|---|---|---|
| P52 | | |
| P53 | 100 | 5 |
| P54 | 100 | 5 |

*These organometallic polyesters were either coated on a panel or exposed as a ⅜" thick plastic cross section to determine their antifouling effectiveness. All of the above polyesters and those listed in Table 2 were cured with tributyltin methacrylate.
+The composition of each polyester is listed in Table 3.

The low leaching organotin containing polymer compositions of this invention permit control of marine fouling organisms including bacteria, algae, tubeworms, hydroids, bryoyoans, marine borers, barnacles, limnoria and tunicates. Many of the compositions are transparent and devoid of color. They are not deactivated by contact with steel or aluminum and do not contribute to galvanic corrosion.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A composition of matter for preventing the growth of fouling organisms on a marine structure, said composition being characterized by a low leaching rate of the antifouling agent from the composition and comprising an organotin containing polymer, said polymer being the reaction product of an unsaturated alkyd resin and an unsaturated compound capable of cross-linking said resin and having as a substituent a carboxylic acid group which has bonded thereto an organotin compound selected from the group consisting of tin oxides and tin hydroxides of the formula:

$$R_2 \underset{R_3}{\overset{R_1}{\diagup}} Sn-O-Sn \underset{R_3}{\overset{R_1}{\diagdown}} R_2 \quad \text{or} \quad R_2 \underset{R_3}{\overset{R_1}{\diagup}} Sn-OH$$

wherein $R_1$, $R_2$ and $R_3$ may be the same or different and are selected from the group consisting of propyl, butyl, phenyl, and benzyl, and wherein said bonding results from the reaction of said carboxylic acid group with said organotin compound.

2. The composition of claim 1 wherein the unsaturated compound capable of cross-linking said alkyd resin is tri-n-butyltin methacrylate.

3. The composition of claim 2 wherein the alkyd resin is a reaction product of maleic anhydride, azelaic acid, and propylene glycol.

4. The composition of claim 1 which additionally contains an organic solvent in which said organotin containing polymer is soluble.

5. The composition of claim 4 wherein the solvent is selected from the group consisting of benzene and dimethyl sulfoxide.

6. The composition of claim 4 wherein the unsaturated compound capable of crosslinking said alkyd resin is tri-n-butyltin methacrylate.

7. The composition of claim 6 wherein the alkyl resin is a reaction product of maleic anhydride, ethylene glycol and propylene glycol.

8. The composition of claim 6 wherein the alkyd resin is a reaction product of sebacic acid and 2-butene-1,4-diol.

9. The composition of claim 6 wherein the alkyd resin is a reaction product of maleic anhydride and D-sorbitol.

10. The composition of claim 6 wherein the alkyd resin is a reaction product of maleic anhydride, phthalic anhydride, and propylene glycol.

11. A method for preventing the growth of fouling organisms on a marine structure which comprises forming said structure from an organotin containing polymer, said polymer being the reaction product of an unsaturated alkyd resin and an unsaturated compound capable of cross-linking said resin and having as a substituent a carboxylic acid group which has bonded thereto an organotin compound selected from the group consisting of tin oxides and tin hydroxides of the formula:

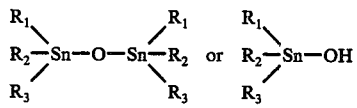

wherein $R_1$, $R_2$, and $R_3$ may be the same or different and are selected from the group consisting of propyl, butyl, phenyl, and benzyl, and wherein said bonding results from the reaction of said carboxylic group with said organotin compound.

12. The method of claim 11 wherein the marine structure is formed by molding the organotin containing polymer into the desired structure.

13. The method of claim 11 wherein the organotin containing polymer is a glass fiber reinforced polymer.

14. The method of claim 11 wherein the unsaturated compound capable of crosslinking said alkyd resin is tri-n-butyltin methacrylate and the alkyd resin is a reaction product of maleic anhydride, azelaic acid, and propylene glycol.

15. A method for preventing the growth of fouling organisms on a marine structure which comprises applying to said structure a coating of an organotin containing polymer, said polymer being the reaction product of an unsaturated alkyd resin and an unsaturated compound capable of cross-linking said resin and having as a substituent a carboxylic acid group which has bonded thereto an organotin compound selected from the group consisting of tin oxides and tin hydroxides of the formula:

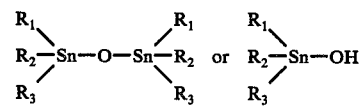

wherein $R_1$, $R_2$, and $R_3$ may be the same or different and are selected from the group consisting of propyl, butyl, phenyl, and benzyl, and wherein said bonding results from the reaction of said carboxylic acid group with said organotin compound.

16. The method of claim 15 wherein the unsaturated compound capable of crosslinking said alkyd resin is tri-n-butyltin methacrylate and the alkyd resin is selected from the group consisting of, the reaction product of maleic anhydride, ethylene glycol, and propylene glycol, the reaction product of sebacic acid and 2-butene-1,4-diol, the reaction product of maleic anhydride and D-sorbitol, and the reaction product of maleic anhydride, phthalic anhydride and propylene glycol.

17. A method for preventing the growth of fouling organisms on a marine structure which comprises impregnating said structure with an organotin containing polymer, said polymer being the reaction product of an unsaturated alkyd resin and an unsaturated compound capable of cross-linking said resin and having as a substituent a carboxylic acid group which has bonded thereto an organotin compound selected from the group consisting of tin oxides and tin hydroxides of the formula:

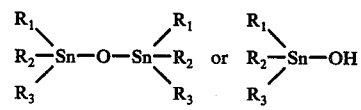

wherein $R_1$, $R_2$, and $R_3$ may be the same or different and are selected from the group consisting of propyl, butyl, phenyl, and benzyl, and wherein said bonding results from the reaction of said carboxylic acid group with said organotin compound.

* * * * *